US009948112B2

(12) United States Patent
Hao et al.

(10) Patent No.: US 9,948,112 B2
(45) Date of Patent: Apr. 17, 2018

(54) APPARATUSES AND RELATED METHODS FOR DETECTING COIL ALIGNMENT WITH A WIRELESS POWER RECEIVER

(71) Applicant: Integrated Device Technology, Inc., San Jose, CA (US)

(72) Inventors: Jianbin Hao, San Jose, CA (US); Detelin Martchovsky, Fremont, CA (US); Chan Young Jeong, San Jose, CA (US); Arman Naghavi, San Martin, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 553 days.

(21) Appl. No.: 14/499,009

(22) Filed: Sep. 26, 2014

(65) Prior Publication Data

US 2016/0094043 A1  Mar. 31, 2016

(51) Int. Cl.
*H01F 38/14* (2006.01)
*H02J 5/00* (2016.01)
*H04B 5/00* (2006.01)
*H02J 50/12* (2016.01)

(52) U.S. Cl.
CPC .............. *H02J 5/005* (2013.01); *H01F 38/14* (2013.01); *H02J 50/12* (2016.02); *H04B 5/0037* (2013.01); *H04B 5/0081* (2013.01)

(58) Field of Classification Search
None
See application file for complete search history.

(56) References Cited

U.S. PATENT DOCUMENTS

| 2011/0304220 | A1* | 12/2011 | Whitehead | H01F 21/08 307/104 |
| 2012/0235506 | A1* | 9/2012 | Kallal | H02J 5/005 307/104 |
| 2012/0235636 | A1* | 9/2012 | Partovi | H02J 7/025 320/108 |
| 2012/0313577 | A1* | 12/2012 | Moes | H04B 5/0037 320/108 |

(Continued)

OTHER PUBLICATIONS

International Search Report for PCT Application No. PCT/US2015/052492 issued by the Korean Searching Authority dated Jan. 20, 2016, pp. 1-3.

(Continued)

*Primary Examiner* — Jared Fureman
*Assistant Examiner* — Joel Barnett
(74) *Attorney, Agent, or Firm* — Haynes and Boone, LLP.

(57) ABSTRACT

A wireless power receiver may include a receive coil configured to generate an AC power signal responsive to wireless power transfer from a wireless power transmitter, and control logic configured to detect misalignment of the receive coil and a transmit coil of the wireless power transmitter responsive to a determination of efficiency of wireless power transfer therebetween. A method for operating a wireless power receiver may include detecting misalignment between a receive coil and a transmit coil of a wireless power transmitter responsive to detecting monitoring a value indicative of efficiency of wireless power transfer between the wireless power transmitter and the wireless power receiver, and causing an indication to be provided to a user to assist with correcting the misalignment.

20 Claims, 3 Drawing Sheets

(56) References Cited

U.S. PATENT DOCUMENTS

| | | | |
|---|---|---|---|
| 2013/0049484 A1* | 2/2013 | Weissentern | H02J 5/005 |
| | | | 307/104 |
| 2013/0088195 A1 | 4/2013 | Yoon et al. | |
| 2013/0234659 A1 | 9/2013 | Lee et al. | |
| 2013/0278140 A1* | 10/2013 | Mudunuri | H05H 1/46 |
| | | | 315/111.21 |
| 2014/0035520 A1 | 2/2014 | Nakayama | |
| 2014/0252874 A1 | 9/2014 | Niizuma | |

OTHER PUBLICATIONS

Written Opinion for PCT Application No. PCT/US2015/052492 issued by the Korean Searching Authority dated Jan. 20, 2016, pp. 1-3.

* cited by examiner

APPARATUSES AND RELATED METHODS FOR DETECTING COIL ALIGNMENT WITH A WIRELESS POWER RECEIVER

FIELD

Embodiments of the present disclosure relate generally to wireless power transfer and, more particularly, to apparatuses and related method for detecting coil alignment during wireless power transfer.

BACKGROUND

Battery-powered devices (e.g., consumer electronic devices, electric and hybrid automobiles, etc.) are charged from a power source (e.g., AC power outlet) through a charging device. The charging device couples the battery to the power source through an adaptor. The cord extending between the power source and the battery-powered device can take up space. In situations where multiple devices require charging, each with their own charger and cord, the charging area can become cramped and inconvenient.

Approaches are being developed that use over-the-air or wireless power transmission between a transmitter and a receiver coupled to the electronic device. Wireless power transmission using inductive coils is one method considered as an un-tethered method for transferring power wirelessly through a coupled wireless power signal. In wireless power transmission, power is transferred by transmitting a wireless power signal through a transmit coil. On the receiver side, a receive coil may couple with the transmit coil through the wireless power signal, thus, receiving the transmitted power wirelessly. The distance between the transmitter coil and receive coil, at which efficient power transfer can take place, is a function of the transmitted energy and the required efficiency. The coupling coefficient (k) is a function of the distance between the coils, the coil sizes, and materials. The power conversion efficiency (e.g., coupling factor, coupling quality) may be significantly improved if the coils are sized and operated at such a frequency that they are physically within the so-called "near-field zone" of each other. An issue encountered during wireless charging transmission includes situations when the transmitter and receiver are weakly coupled, which may occur due to misalignment of the transmitter and receiver. As a result, the wireless power transfer may be less efficient, which may also result in excess heat.

BRIEF SUMMARY

Embodiments of the present disclosure include a wireless power enabled apparatus, comprising a wireless power receiver. The wireless power receiver includes a receive coil configured to generate an AC power signal responsive to wireless power transfer from a wireless power transmitter, and control logic configured to detect misalignment of the receive coil and a transmit coil of the wireless power transmitter responsive to a determination of efficiency of wireless power transfer therebetween.

Another embodiment of the present disclosure includes a wireless power enabled apparatus comprising a wireless power receiver. The wireless power receiver includes a receive coil configured to generate an AC power signal responsive to a wireless power signal and control logic configured to detect misalignment between the receive coil and a transmit coil of a wireless power transmitter based, at least in part, on a comparison of a measured value with a reference value. The measured value is indicative of the efficiency of wireless power transfer from the wireless power transmitter and the wireless power receiver. The reference value is indicative of an expected measured value for an operating condition of the wireless power receiver.

Another embodiment of the present disclosure includes a method for operating a wireless power receiver. The method comprises detecting misalignment between a receive coil and a transmit coil of a wireless power transmitter responsive to detecting monitoring a value indicative of efficiency of wireless power transfer between the wireless power, transmitter and the wireless power receiver, and causing an indication to be provided to a user to assist with correcting the misalignment.

DETAILED DESCRIPTION

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description.

It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application-Specific Integrated Circuit (ASIC), a Field-Programmable Gate Array (FPGA) or other programmable logic device, a controller, discrete gate or transistor logic, discrete hardware components, or any combination thereof designed to perform the functions described herein. All of which may be termed "control logic."

A general-purpose processor may be a microprocessor, but in the alternative, the general-purpose processor may be any processor, controller, microcontroller, or state machine suitable for carrying out processes of the present disclosure. A processor may also be implemented as a combination of computing devices, such as a combination of a DSP and a microprocessor, a plurality of microprocessors, one or more microprocessors in conjunction with a DSP core, or any other such configuration.

A general-purpose processor may be part of a general-purpose computer, which should be considered a special-purpose computer when configured to execute instructions (e.g., software code) for carrying out embodiments of the present disclosure. Moreover, when configured according to embodiments of the present disclosure, such a special-purpose computer improves the function of a general-purpose computer because, absent the present disclosure, the general-purpose computer would not be able to carry out the processes of the present disclosure. The present disclosure also provides meaningful limitations in one or more particular technical environments that go beyond an abstract idea. For example, embodiments of the present disclosure provide improvements in the technical field of wireless power transfer and, more particularly, to apparatuses and related method for detecting coil alignment during wireless power transfer.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

It should be recognized that the devices of a wireless power transfer system is described herein primarily with respect to functionality of wireless power transfer; however, it should be recognized that the wireless power transfer system may include additional components to perform other features not specifically described herein or shown in the various figures. For example, wireless power enabled devices may include communication modules, I/O modules for interfacing with a user, memory for storing instructions and data, various sensors, processors, controllers, voltage regulators, among other components. The figures and accompanying description may, therefore, be somewhat simplified to focus on the various apparatuses and methods that are configured to provide wireless power transfer and detection of characteristics of the magnetic flux field and conditions of the wireless power transfer system.

Figure 1:
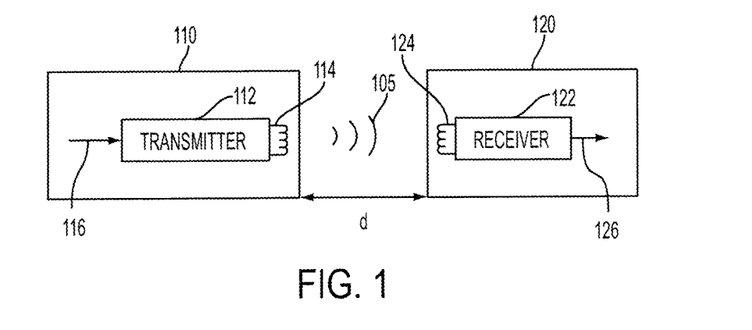
FIG. 1 is a schematic block diagram of a wireless power transfer system.

FIG. 1 is a schematic block diagram of a wireless power transfer system 100. The wireless power transfer system 100 includes a wireless power transmitting apparatus 110, and a wireless power receiving apparatus 120. The wireless power transmitting apparatus 110 includes a wireless power transmitter 112 having a transmit coil 114 configured to generate a wireless power signal 105 (e.g., electric field, magnetic field, electromagnetic field, etc.) for providing power transfer (e.g., through inductive coupling) to the wireless power receiving apparatus 120. The wireless power receiving apparatus 120 includes a wireless power receiver 122 having a receive coil 124 configured to couple with the wireless power signal 105. The transmit coil 114 and the receive coil 124 may be sized according to the particular devices and applications to be associated therewith.

An input signal 116 may be provided to the wireless power transmitter 112 for generating the wireless power signal 105 that provides a power transfer to the wireless power receiving apparatus 120. The wireless power receiver 122 may couple to the wireless power signal 105 and may generate an output signal 126 in response thereto. The output signal 126 may provide the power that is used by the wireless power receiving apparatus 120 for storing (e.g., charging a battery), consumption (e.g., providing system power), or a combination thereof.

The wireless power transmitter 112 and the wireless power receiver 122 are separated by a distance (d). In some embodiments, the wireless power transmitter 112 and the wireless power receiver 122 may be configured according to a mutual inductance relationship, such that when the resonant frequency of the wireless power receiver 122 and the resonant frequency of the wireless power transmitter 112 are substantially identical, transmission losses between the wireless power transmitter 112 and the wireless power receiver 122 are minimal. Likewise, the operating frequency of the wireless power signal 105 may be set by the wireless power transmitter 112 at or near the resonant frequencies of the coils 114, 124. As a result, an effective power transfer may occur by coupling a large portion of the energy in the near-field of the transmit coil 114 to the receive coil 124 rather than propagating most of the energy in an electromagnetic wave to the far-field. In some embodiments, the wireless power transmitter 112 may be configured to adjust the amount of power being delivered by adjusting the operating frequency of the wireless power signal 105. In other words, the operating frequency of the wireless power signal 105 may vary if more or less transmitting power is needed to provide the desired power to the wireless power receiving apparatus 120. If the wireless power receiving apparatus 120 is in the near-field (within some distance (d)), inductive coupling may occur between the transmit coil 114 and the receive coil 124. The area around the transmit coil 114 and receive coil 124 where this near-field inductive coupling may occur may be referred to as a "coupling region." Because of this mutual inductance relationship, the wireless power transfer may be referred to as inductive wireless power transfer.

The transmit coil 114 and the receive coil 124 may be configured as a "loop" antenna, which may also be referred to herein as a "magnetic" antenna or an "inductive" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive coil 124 within a plane of the transmit coil 114 where the coupling region of the transmit coil 114 may be more powerful.

The wireless power receiving apparatus 120 may be a mobile electronic device, such as a cell phone, a smart phone, a media player (e.g., mp3 player, DVD player, etc.), an electronic reader, a tablet computer, a personal digital assistant (PDA), a camera, a laptop computer, and personal electronic device in which wireless power signal 105 may be received. The wireless power receiving apparatus 120 may also be a less mobile electronic device, such as a television, personal computer, media player (e.g., DVD player, Blu-ray player, etc.) or any other device that may operate by, and/or store electrical power. The wireless power receiving apparatus 120 may be one of a number of other items, such as an automobile or any other devices that may include batteries that may be charged through the wireless power transmitting apparatus 110.

The wireless power transmitting apparatus 110 may be a device that may, at times, also be the recipient of wireless power transfer. In other words, some devices may be configured as both a wireless power transmitting apparatus 110 and a wireless power receiving apparatus 120, such that the device may transmit wireless power or receive wireless power depending on the mode of operation. Thus, embodiments of the present disclosure include devices that may include a wireless charging transceiver configured to operate in either a transmit mode or a receive mode. Using the term "receiver" indicates that a device is configured to receive wireless power transfer, but should not be interpreted to mean that the device only operates as a receiver. Similarly, using the term "transmitter" indicates that the device is configured to transmit wireless power, but should not be interpreted to mean that the device only operates as a transmitter.

In operation, the user may place the wireless power receiving apparatus 120 in proximity of the wireless power transmitting apparatus 110; however, the receive coil 124 and the transmit coil 114 may not be aligned. The highest efficiency power transfer may occur when the receive coil 124 and the transmit coil 114 are in positional alignment—that is, when the receive coil 124 is directly over the transmit coil 114 (i.e., the centers are aligned in the X/Y directions). While in alignment, the magnetic flux field may be relatively symmetrical about the receive coil 124, and the efficiency of power transfer may be substantially near its peak. As the receive coil 124 moves off alignment from the transmit coil 114, the efficiency of wireless power transfer may be reduced. It is noted that when discussing movement of either the wireless power transmitter 112 and its components, or the wireless power receiver 122 and its components, for purposes of this disclosure the movement is relative to each other. It is recognized that some wireless power transmitters 112 may be relatively stationary or even built into a stationary object. In such a situation, moving the wireless power transmitter 112 or its components may mean physically moving the wireless power receiver 122. Though it is less common, some wireless power receivers 122 may be relatively stationary and the wireless power transmitter 112 may be physically moved in that case.

Misalignment may be caused by user error when the user positions the wireless power receiving apparatus 120. Misalignment is also often caused by movement of the wireless power receiving apparatus 120 from its original placement from other forces (e.g., the wireless power receiving apparatus 120 may be bumped, moved by vibrations, etc.). Regardless of the reasons for the misalignment, it may be desirable for the wireless power transmitting apparatus 110 to detect the misalignment, as even a small amount of mismatch between the receive coil 124 and the transmit coil 114 may lower the wireless power transfer efficiency. The reduced efficiency may result in wasted power, increased heat in the components, slower battery charging, among other undesirable issues. In addition to the reduced efficiency, built-up energy from fringing magnetic fields that result from misalignment may cause problems. For example, if the user quickly moves the wireless power receiving apparatus 120 so that the receive coil 124 moves back into alignment with the transmit coil 114, the sudden change from the built-up energy may overwhelm (e.g., burn) the components of the wireless power receiving apparatus 120. To protect against this situation, conventional wireless power receivers may include a clamp that is enabled to protect its components; however, even with clamps, large amounts of energy may still overwhelm and damage wireless power receivers in such situations. Thus, it may also be desirable for the wireless power transmitting apparatus 110 to detect misalignment though embodiments of the present disclosure.

Embodiments of the present disclosure include apparatuses and methods for detecting the alignment of the coils of the wireless power transfer system 100. For example, the wireless power receiver 122 may be configured to determine the misalignment of the transmit coil 114 and the receive coil 124 based on a determination of the efficiency of the wireless power transfer. For example, the wireless power receiver 122 may determine the efficiency of the wireless power transfer based, at least in part, on detecting the operating frequency of the wireless power transfer. In some embodiments, the efficiency may be determined by detecting a voltage amplitude across the receive coil 124. In some embodiments, the wireless power receiving apparatus 120 may be configured to receive information (e.g., transmit power level) from the wireless power transmitting apparatus 110 to assist in the efficiency determination for detecting misalignment.

In response to detecting misalignment, the user may be notified and/or assisted in obtaining proper alignment of the receive coil 124 and the transmit coil 114. For example, the wireless power receiving apparatus 120 and/or the wireless power transmitting apparatus 110 may provide the user with an indication of the alignment status. The alignment indication may be provided visually (e.g., via an electronic display, flashing light, etc.), audibly (e.g., voice, beep, alarm, tone, etc.), and/or through a tactile indication (e.g., vibration). As a non-limiting example, the wireless power receiving apparatus 120 may display a graphical user interface (GUI) that indicates different levels of alignment. The visual indication on the GUI may include a bar graph having different levels, a numerical indication, or other desired method for representing to the user the level of misalignment. As the user moves the wireless power receiving apparatus 120, the alignment indication may adjust responsive to the new position indicating either an improved or decreased alignment. When the user achieves the desired alignment, the user may leave the wireless power receiving apparatus 120 in its corresponding place to achieve the higher efficiency wireless power transfer. Other forms of visual indication with GUIs is also contemplated.

Figure 2:
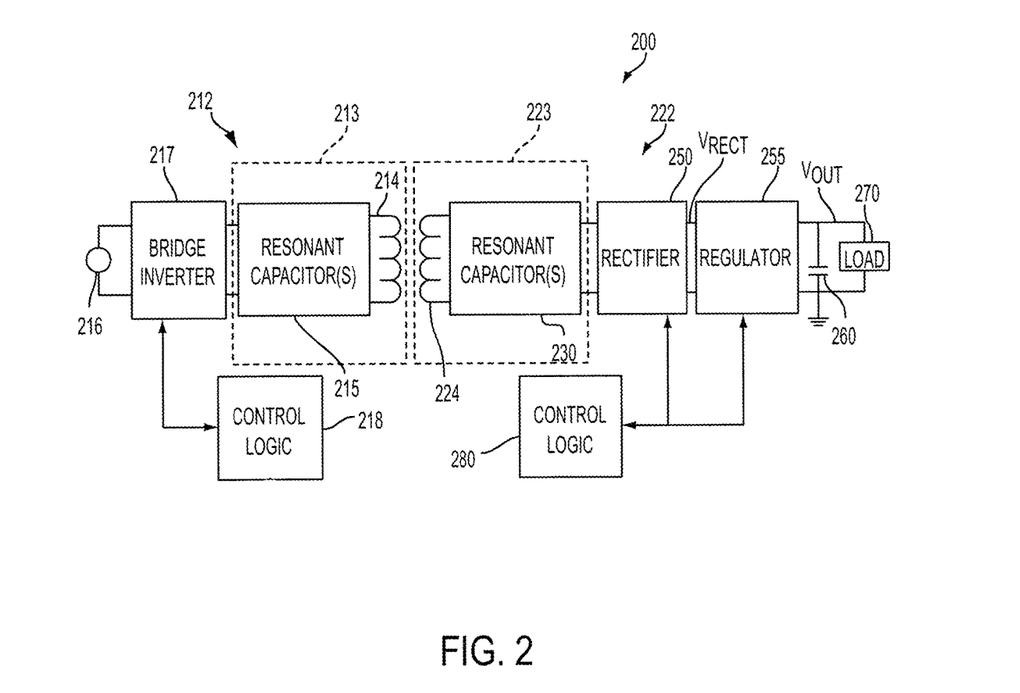
FIG. 2 is a schematic block diagram of a wireless power transfer system.

FIG. 2 is a schematic block diagram of a wireless power transfer system 200 according to an embodiment of the present disclosure. The wireless power transfer system 200 includes a wireless power transmitter 212 and a wireless power receiver 222. The wireless power transmitter 212 and the wireless power receiver 222 may be configured to couple with each other according to a mutual inductance relationship such that wireless power signal 105 (FIG. 1) may be transferred from the wireless power transmitter 212 to the wireless power receiver 222.

The wireless power transmitter 212 may include a resonant tank 213, a bridge inverter 217, and transmitter control logic 218 coupled together to generate the wireless power signal 105 transmitted to the wireless power receiver 222. The resonant tank 213 may include a transmit coil 214 coupled with resonant capacitors 215. The bridge inverter 217 of the wireless power transmitter 212 may include a full bridge inverter, a half bridge inverter, or other appropriate circuit for receiving a DC input signal 216 and generate an AC signal through the transmit coil 214 for generating the wireless power signal 105.

The wireless power receiver 222 includes a resonant tank 223, rectifier 250, and a regulator 255, and control logic 280 coupled together to receive the wireless power signal 105 and generate an output signal ($V_{OUT}$) in response thereto. The output signal ($V_{OUT}$) may be provided to a load 270 (e.g., a battery, system components, etc.), which may also have an output capacitor 260. The resonant tank 223 may include a receive coil 224 coupled with resonant capacitors 230. The wireless power transmitter 212 and the wireless power receiver 222 may be incorporated within a wireless power transmitting apparatus 110 (FIG. 1) and a wireless power receiving apparatus 120 (FIG. 1), respectively. The transmit coil 214 and the receive coil 224 (and other components) may be sized according to the particular devices and applications to be associated therewith.

The wireless power transmitter 212 and wireless power receiver 222 may be generally configured as discussed above with respect to FIG. 1. The configurations of the LC networks within the resonant tanks 213, 223 may generally determine the resonant frequencies of the wireless power transmitter 212 and the wireless power receiver 222, respectively. For example, the resonant frequency of the resonant tanks 213, 223 may be based on the inductance of their respective inductive coil and the capacitance of the plates of the capacitors.

During wireless power transmission, the input signal 216 (a DC signal) may be received by the bridge inverter 217. The bridge inverter 217 may generate an AC current that flows through the resonant tank 213 to generate a time-varying signal for transmitting the wireless power signal 105. Thus, the wireless power signal 105 may be a time-varying signal that is substantially sinusoidal, having a frequency that may be based on the switching frequency of the bridge inverter 217 of the wireless power transmitter 212. In some embodiments, the frequency of the wireless power signal 105 may be set according to the desired frequency, such as a frequency for a particular wireless power standard. The resonant tank 213 may be configured such that the resonant frequency is approximately the frequency of the wireless power signal 105. In some embodiments, it may be desirable for the frequency of the wireless power signal 105 to differ somewhat from the resonant frequency of the resonant tank 213, such as to reduce the peak-to-peak current through the transmit coil 214.

In order to receive wireless power signal 105, the wireless power receiver 222 may be placed in the coupling region of the wireless power transmitter 212 such that inductive coupling may be achieved. As a result, the wireless power receiver 222 may receive the wireless power signal 105 and generate an AC power responsive thereto. In order for the power to be used by the load 270, the AC power may be converted to a DC power. The rectifier 250 may generate a rectified voltage ($V_{RECT}$) as well as a rectified current ($I_{RECT}$) flowing through the resonant tank 223. In some embodiments, the rectifier 250 may be configured as a synchronous rectifier. As a result, the rectifier 250 may include one or more switches that are controlled in such a manner to generate the DC output power signal (i.e., rectified voltage ($V_{RECT}$) and rectified current ($I_{RECT}$)). In some embodiments, the rectifier 250 may include one or more diodes configured to generate the DC output power signal.

The regulator 255 may receive the rectified voltage ($V_{RECT}$) and convert the rectified voltage to have a desired voltage level for the output voltage ($V_{OUT}$). For example, in some embodiments, the regulator 255 may convert the rectified voltage ($V_{RECT}$) from a low voltage to a relatively higher voltage for the output voltage ($V_{OUT}$). In some embodiments, the regulator 255 may convert the rectified voltage ($V_{RECT}$) from a high voltage to a relatively lower voltage for the output voltage ($V_{OUT}$). In some embodiments, the regulator 255 may invert the rectified voltage ($V_{RECT}$) from a positive voltage to a negative voltage, or vice versa. The regulator 255 may be configured according to one of a variety of different voltage regulator topologies. For example, the regulator 255 may be configured according to one or more of a buck topology, a boost topology, a buck-boost topology, an inverting topology, and a low dropout (LDO) topology. In some embodiments, the regulator 255 may be configured according to a transformer-based topology (e.g., forward, flyback, etc.). The operation of the regulator 255 may be controlled by the control logic 280 according to the topology being used.

The control logic 280 of the wireless power receiver 222 may be configured to control one or more operations of the wireless power receiver 222. Each of the control logic 218, 280 may be implemented within a processor (e.g., microcontroller) or other circuitry that is configured (e.g., programmed) to perform various operations of embodiments of the present disclosure. Each of the control logic 218, 280 may further include computer-readable media (e.g., memory) storing computing instructions for execution by the processor related to performing processes of the embodiments of the present disclosure. Memory may include volatile and non-volatile memory. In addition, each of the control logic 218, 280 may further control other functions of the respective wireless power transmitter 212, wireless power receiver 222, such as controls related to foreign object detection, device operation, etc. The control logic 218, 280 may each include different sub-blocks that perform one or more of the above functions separately rather than by employing within a single process, routine, program, etc. In addition, the control logic 218, 280 may each employ different hardware elements for different functions.

As discussed above, the highest efficiency power transfer may occur when the receive coil 224 and the transmit coil 214 are in positional alignment. As the receive coil 224 moves off alignment from the transmit coil 214, the efficiency of wireless power transfer may be reduced and more power may be required to be transmitted by the wireless power transmitter 212. As a result, the wireless power transmitter 212 may adjust (e.g., decrease) the operating frequency of the wireless power signal 105 to be closer to the resonant frequencies of the coils 214, 224. If misalignment is reduced, less power may be required to be transmitted by the wireless power transmitter 212. As a result, the wireless power transmitter 212 may adjust (e.g., increase) the operating frequency of the wireless power signal to be further away from the resonant frequency of the coils 214, 224.

The control logic 280 of the wireless power receiver 222 may be configured to detect the misalignment of the wireless power transfer by determining the efficiency for the wireless power transfer. The efficiency for the wireless power transfer may be defined as the ratio of the received power/transmitted power. The operating frequency of the wireless power signal 105 may be indicative of this efficiency as the operating frequency varies depending on the amount of power needed to be transmitted by the wireless power transmitter 212. The control logic 280 may be configured to monitor the AC voltage signal generated by the receive coil 214 to determine the operating frequency thereof over time. Based on the operating frequency and other conditions (e.g., other known operational modes), the wireless power receiver 222 may determine the efficiency and corresponding level of misalignment. For example, the wireless power receiver 222 may include a look-up table with stored values for corresponding misalignment status for different operational frequencies and operational modes. The wireless power receiver 222 may then provide a notification to the user (e.g., visual, audible, tactile, etc.) to guide the user to align the transmit coil 114 and the receive coil 124.

During operation, various components of the wireless power receiver 222 may operate in different modes. For example, the rectifier 250 may be configured to operate in one of a diode mode, a half-synchronous mode, and a full synchronous mode. The rectifier 250 may experience a different power loss during each of these modes. The voltage regulator 255 may also be configured to operate in one of a plurality of different modes. The modes may be defined by the voltage (e.g., 6V, 5.3V, etc.) that is input to the regulator 255. The voltage regulator 255 may also experience a different power loss during each of these modes. The control logic 280 may be aware of which operational mode the rectifier 250 is currently operating in, and subtract the appropriate loss for the component during the corresponding operational mode. As a result, the power loss attributed to the wireless power receiver 212 may be removed to more accurately determine the loss attributed to the misalignment. In some embodiments, different data sets may be stored for reference values corresponding to different operational frequencies and operational modes. Thus, the adjustment for operational modes may be achieved by selecting comparing the operational frequency with the data set for a particular operational mode.

Figure 3:
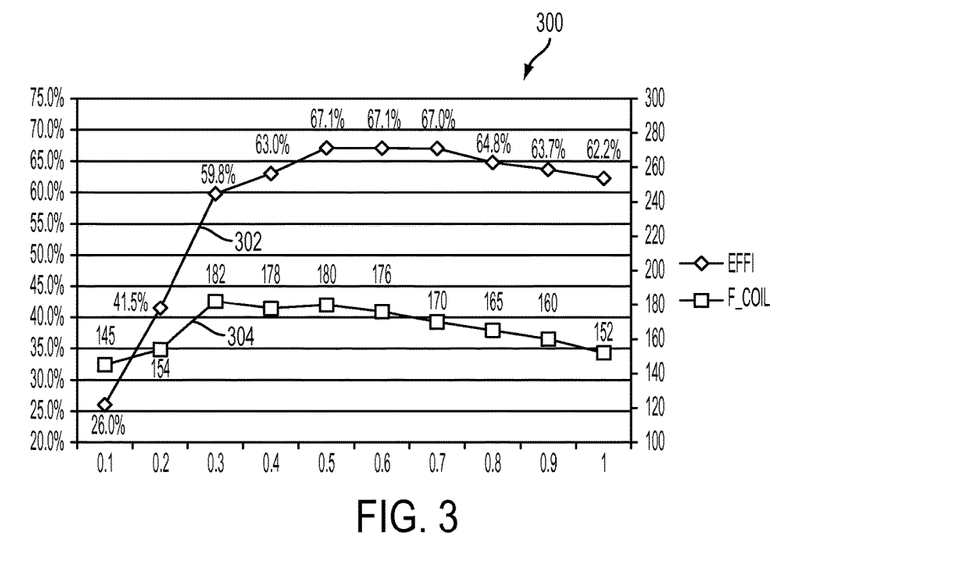
FIG. 3 is a graph showing different efficiencies and corresponding operating frequencies when the transmit coil and the receive coil are at least substantially aligned for different load conditions.

FIG. 3 is a graph 300 showing different efficiencies (line 302) and corresponding operating frequencies (line 304) when the transmit coil 214 and the receive coil 224 are at least substantially aligned for different load conditions. The x-axis represents the load condition (in Amps), the left y-axis represents the efficiency (as a percentage), and the right y-axis represents the operating frequency (in kHz). These results are for the aligned state. Efficiency may be measured as a ratio or simply as an amount of power loss.

As shown in FIG. 3, during the aligned state, the operating frequency and corresponding efficiency value may respectively be 67.1% and 180 kHz for a 0.5 A load. For a 0.6 A load, the operating frequency and corresponding efficiency value may be 67% and 176 kHz, respectively. Other combinations may be as shown for the other load conditions. Of course, these values are provided as non-limiting examples and may depend on the actual system and desired operating frequency for a particular application. Similar values may be determined for various misalignment states to populate a look-up table to be used during operation to determine the misalignment of the system.

Figure 4:
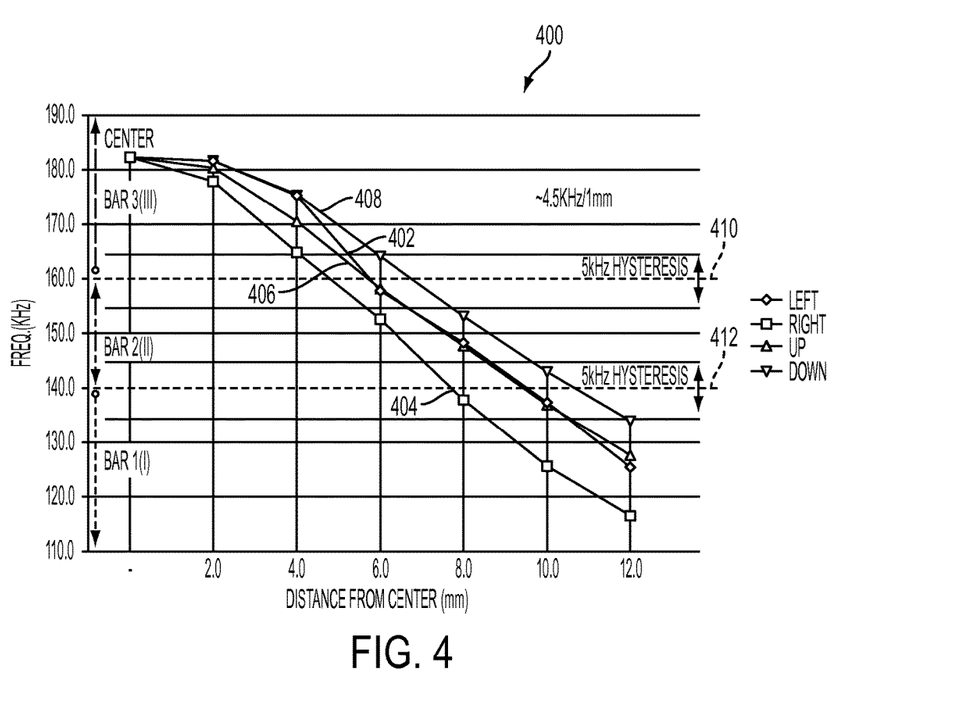
FIG. 4 is a graph showing different operating frequencies for different amounts of misalignment for a fixed load condition.

FIG. 4 is a graph 400 showing different operating frequencies (lines 402-408) for different amounts of misalignment for a fixed load condition (e.g., 0.5 A). The x-axis represents the distance (mm) from the center for misalignment. The y-axis represents the operating frequency (kHz). For example, line 402 shows the corresponding operating frequency changing as the receive coil 224 is moved to the left of the transmit coil 214. Line 404 shows the corresponding operating frequency changing as the receive coil 224 is moved to the right of the transmit coil 214. Line 406 shows the corresponding operating frequency changing as the receive coil 224 is moved up from the transmit coil 214. Line 408 shows the corresponding operating frequency changing as the receive coil 224 is moved down from the transmit coil 214.

When providing the alignment status indication, different threshold levels 410, 412 may be defined. Thus, for operating frequencies above the first threshold 410, the top amount of alignment (e.g., "Bar 3 (III)") may be indicated to the user. In other words, any misalignment between a desired tolerance range (e.g., 0-6 mm) may be deemed acceptable for purposes of the indication even though perfect alignment is not achieved. For operating frequencies above between the first threshold 410 and the second threshold 412, the top amount of alignment (e.g., "Bar 2 (II)") may be indicated to the user. For operating frequencies below the second threshold 412, the lowest amount of alignment (e.g., "Bar 1 (I)") may be indicated to the user. Any number of thresholds may be defined according to the desired number of levels to be indicated. For example, some embodiments may include a binary determination (i.e., either "good" or "bad" alignment), while some embodiment may include a determination having a plurality of levels. There may be an amount of hysteresis (e.g., 5 kHz) allowed so that the system does not fluctuate too often between levels.

The indications may be provided to the user visually, such as a bar graph (e.g., Bar 1 (I), Bar 2 (II), Bar 3 (III)) that moves up and down levels as alignment changes. Other visual indications are also contemplated. The indications may be provided to the user audibly, such as beeps, tones, etc. that change in some manner (e.g., pattern, volume, frequency, voice instructions, etc.) to differentiate between different levels of alignment. The indications may also be provided through a tactile response change (e.g., vibration) that may also change in some manner (e.g., vibration strength, pattern, etc.). A combination of one or more of these forms of indication is also contemplated.

The values of FIGS. 3 and 4 may be stored in the look up table used to determine the misalignment of the receive coil and the transmit coil. These values may be used as reference values for comparison with an operating frequency during use. The reference values may be adjusted according to other losses in the system that are not attributed to misalignment. For example, power losses attributed to different operating conditions of the wireless power receiver may be subtracted out of the efficiency determination. The different operating conditions may include a load condition, different modes of operation of the rectifier and/or the voltage converter, or other desired operating condition. As a result, during operation of the wireless power receiver, the control logic may be aware of the operating conditions and compare the detected operating frequency with the reference values in the look up table to determine an amount of misalignment based on the operating frequency and known operating conditions.

Although the fixed load condition of FIG. 4 is shown as 0.5 A, similar data may be measured and stored as reference data (e.g., reference operating frequencies) at different load conditions (e.g., 0.1 A, 0.2 A, 0.3 A, etc.) as desired. In addition, similar data may be measured and stored as reference data for different operational modes of the components (e.g., rectifier, of the wireless power receiver. Additional data sets may be measured and stored as reference data for different combinations of load conditions and operational modes of the wireless power receiver. Thus, the operating conditions of the wireless power receiver may be known to the control logic and the data set for the appropriate data set (e.g., load condition 1, operating condition 2, operating condition 4) may be used for the operating frequency to be compared with the reference operating frequencies of that data set in order to determine the level of misalignment.

Figure 5:
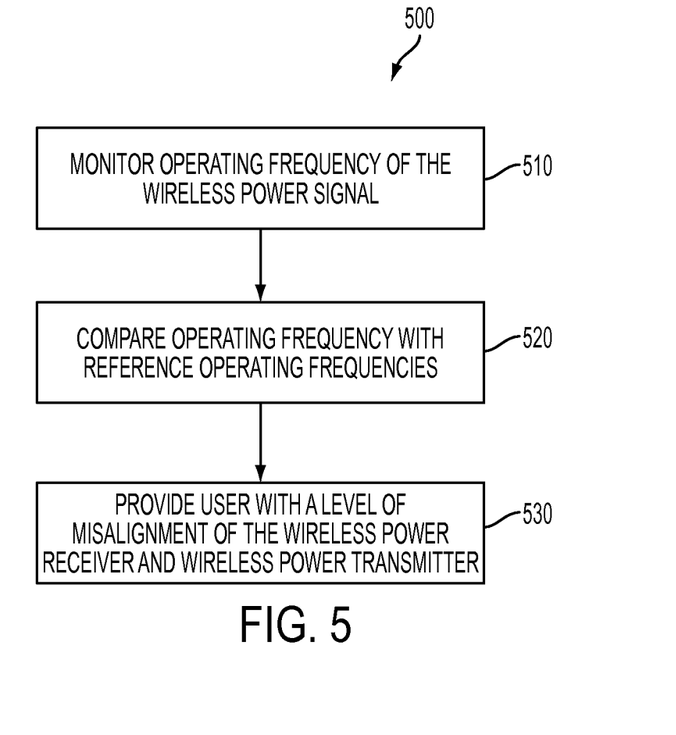
FIG. 5 is a flowchart illustrating a method for detecting misalignment between a wireless power receive coil and a wireless power transmit coil.

FIG. 5 is a flowchart 500 illustrating a method for detecting misalignment between a wireless power receive coil and a wireless power transmit coil. At operation 510, the operating frequency of the wireless power signal is detected. The operating frequency may be detected by monitoring the AC signal generated by the receive coil. The operating frequency may be an indication of the level of power being transmitted by the wireless power transmitter, because typically the operating frequency may be lowered if more power is needed. Thus, a lower operating frequency may indicate less efficient wireless power transfer.

At operation 520, the operating frequency may be compared with other reference operating frequencies to determine a level of misalignment. In some embodiment, the efficiency may be determined as ratio of the received power divided by the transmit power. In some embodiments, the efficiency may be determined as an amount of power loss. The determined efficiency (e.g., received power and/or total power loss) may be adjusted to compensate for other losses in the system that are not attributed to misalignment. For example, power losses attributed to different operating conditions of the wireless power receiver may be subtracted out of the efficiency determination. The different operating conditions may include a load condition, different modes of operation of the rectifier and/or the voltage converter, or other desired operating condition.

At operation 530, the level of misalignment may be provided to the user through an indication element. The indication element may be an electronic display, a vibrating element, and/or a speaker that may be configured to provide an appropriate indication to the user with the level of misalignment.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the disclosure. In addition, features from one embodiment may be combined with features of another embodiment while still being encompassed within the scope of the disclosure as contemplated by the inventor.

What is claimed is:

1. A wireless power enabled apparatus, comprising:
a wireless power receiver, including:
a receive coil configured to generate an AC power signal responsive to wireless power received from a wireless power transmitter; and
a control logic configured to:
determine an efficiency of wireless power transfer between a transmit coil and the receive coil; and
determine an amount of positional misalignment of the receive coil with respect to the transmit coil, when the receive coil is in a near field zone of the transmit coil, based at least on the determined efficiency.

2. The wireless power enabled apparatus of claim 1, wherein the control logic is configured to determine the efficiency of wireless power transfer based, at least in part, on determining an operating frequency of the AC power signal, and wherein the control logic is further configured to determine the amount of positional misalignment based at least in part on the operating frequency of the AC power signal.

3. The wireless power enabled apparatus of claim 2, wherein the control logic is configured to compare the operating frequency of the AC power signal with a look up table comprising positional misalignment amounts and corresponding operating frequencies.

4. The wireless power enabled apparatus of claim 3, wherein the look up table includes different entries of the operating frequencies adjusted for different operating conditions of the wireless power receiver.

5. The wireless power enabled apparatus of claim 4, wherein the different operating conditions include a load condition.

6. The wireless power enabled apparatus of claim 4, wherein the different operating conditions include an operational mode of a rectifier of the wireless power receiver.

7. The wireless power enabled apparatus of claim 6, wherein the operational mode of the rectifier includes one of a diode mode, half-synchronous mode, and full-synchronous mode.

8. The wireless power enabled apparatus of claim 4, wherein the different operating conditions include an operational mode of a voltage converter of the wireless power receiver.

9. The wireless power enabled apparatus of claim 8, wherein the operational mode of the voltage converter includes an input voltage level for the voltage converter.

10. The wireless power enabled apparatus of claim 1, wherein the control logic is further configured to provide an indication signal configured to indicate to a user a level of positional misalignment as either acceptable or unacceptable.

11. A wireless power enabled apparatus, comprising: a wireless power receiver, including:
a receive coil configured to generate an AC power signal responsive to a wireless power signal; and
a control logic configured to:
determine an efficiency of wireless power transfer from a wireless power transmitter to the wireless power receiver; and determine an amount of positional misalignment between the receive coil and a transmit coil of the wireless power transmitter, when the receive coil is in a near field zone of the transmit coil, based at least in part, on a comparison of a measured value with a reference value, the measured value indicative of the determined efficiency of wireless power transfer and the reference value indicative of an expected value of the efficiency of the wireless power transfer adjusted based on an operating condition of the wireless power receiver.

12. The wireless power enabled apparatus of claim 11, wherein the measured value and the reference value are power loss values.

13. The wireless power enabled apparatus of claim 11, wherein the measured value and the reference value are ratios of received power and transmitted power.

14. The wireless power enabled apparatus of claim 11, wherein data associated with the transmitted power is received by the control logic via communication with the wireless power transmitter.

15. The wireless power enabled apparatus of claim 11, wherein the measured value and the reference value are determined based on operating frequencies for the wireless power signal.

16. The wireless power enabled apparatus of claim 11, wherein the measured value and the reference value are determined based on voltages across the receive coil.

17. The wireless power enabled apparatus of claim 11, wherein the wireless power receiver further includes:
a rectifier and a voltage converter operably coupled with the receive coil to receive the AC power signal, wherein at least the reference value is adjusted for the operating condition that includes an operational mode of the rectifier and the voltage converter.

18. A method for operating a wireless power receiver, the method comprising:
determining a value indicative of an efficiency of wireless power transfer between a wireless power transmitter and the wireless power receiver;
determining an amount of positional misalignment between a receive coil of the wireless power receiver and a transmit coil of the wireless power transmitter, when the receive coil is in a near field zone of the transmit coil, based on the determined value; and
causing an indication of the amount of positional misalignment to be provided to a user to assist with correcting the positional misalignment.

19. The method of claim 18, wherein the determining the value indicative of the efficiency of wireless power transfer includes:
monitoring an operating frequency of a wireless power signal; and
comparing the operating frequency with reference operating frequencies, each reference frequency indicative of one of the efficiency of wireless power transfer or the amount of positional misalignment between the receive coil and the transmit coil, wherein the efficiency of wireless power transfer is adjusted based on an operating condition of the wireless power receiver.

20. The method of claim 18, wherein the causing the indication of the positional misalignment to be provided to the user to assist with correcting the positional misalignment includes providing the user with a level of misalignment from among a plurality of different levels of misalignment.

* * * * *